(12) United States Patent
Brash

(10) Patent No.: US 7,344,183 B2
(45) Date of Patent: Mar. 18, 2008

(54) BUG DEFLECTOR FOR PUG-NOSED VEHICLES

(76) Inventor: Donald L. Brash, 1365 Stratford Dr., Clearwater, FL (US) 33756

( * ) Notice: Subject to any disclaimer, the term of this patent is extended or adjusted under 35 U.S.C. 154(b) by 49 days.

(21) Appl. No.: 11/183,394

(22) Filed: Jul. 18, 2005

(65) Prior Publication Data

US 2006/0012208 A1 Jan. 19, 2006

Related U.S. Application Data

(60) Provisional application No. 60/588,920, filed on Jul. 16, 2004.

(51) Int. Cl.
*B60R 27/00* (2006.01)
(52) U.S. Cl. .................. 296/180.3; 296/180.1
(58) Field of Classification Search ................. 296/91, 296/97.9, 95.1, 180.1, 180.3, 180.5, 97
See application file for complete search history.

(56) References Cited

U.S. PATENT DOCUMENTS

| | | | | | |
|---|---|---|---|---|---|
| 3,862,777 | A | * | 1/1975 | Schifano | 296/91 |
| 3,929,369 | A | * | 12/1975 | Blair | 296/91 |
| 4,178,034 | A | * | 12/1979 | Mittendorf | 296/91 |
| 4,547,013 | A | * | 10/1985 | McDaniel | 296/180.1 |
| 4,936,599 | A | * | 6/1990 | McNamee | 280/770 |
| 5,791,719 | A | * | 8/1998 | Alley | 296/91 |
| 6,547,305 | B1 | * | 4/2003 | Ellis | 296/91 |

* cited by examiner

*Primary Examiner*—Lori L. Lyjak
(74) *Attorney, Agent, or Firm*—McKee, Voorhees & Sease, P.L.C.

(57) ABSTRACT

An apparatus and method for deflecting air and bugs and other debris from the windshield of a pug-nosed vehicle. The apparatus comprises a mounting bracket to the vehicle, and a bug deflector. An intermediate portion is adapted to allow adjustment of both distance of the deflector from the vehicle front and angular orientation of the deflector to the vehicle front.

18 Claims, 10 Drawing Sheets

BUG DEFLECTOR FOR PUG-NOSED VEHICLES

CROSS-REFERENCE TO RELATED APPLICATIONS

This application claims priority under 35 U.S.C. § 119 of provisional application Ser. No. 60/588,920 filed Jul. 16, 2004, which application is hereby incorporated by reference in its entirety.

I. BACKGROUND OF THE INVENTION

A. Field of the Invention

The present invention relates to bug shields and deflectors for automobiles, and in particular, for pug or substantially flat front vehicles such as certain motor homes, commercial busses, and over-the-road tractor trailers and trucks.

B. Problems in the Art

The advantages of bug and wind shields and deflectors are well known. By putting a shield or panel across and at or near the front of the vehicle and creating an airflow that is substantially directed up and over the windshield, the windshield can be kept clearer of splattered bugs, debris, and even rain. This can not only ease maintenance and cleaning of the vehicle, but can also improve safety by providing increased visibility to the driver.

A number of these types of shields are commercially available for many cars, pickups, and certain types of over-the-road tractors and trucks. However, there is no known adequate such shield for what will be called pug-nosed vehicles, which for purposes herein includes, but is not limited to, the type of vehicle such as Class A motor homes, many commercial buses, and certain over-the-road tractors and trucks. These types of pug-nosed vehicles have, generally, a substantially blunt or flat front end from the front bumper up to the roof above the windshield.

In comparison, the windshield in non-pug-nosed vehicles is substantially rearward from the front of the vehicle. Bug deflectors are usually mounted at or near the front of the vehicle, spaced well ahead of the windshield. On non-pug-nosed vehicles, the deflector tries to direct air up somewhat upwardly so that it flows in an arc over the windshield that is spaced several feet behind it. However, with pug-nosed vehicles, there is no horizontal spacing between the front of the vehicle and the windshield. They are many times almost co-planar in a vertical plane. This presents the problem of how an air stream can be created to arc over the pug-nosed windshield, when the windshield is in essentially the same vertical plane as the mounting location for a bug deflector.

Additionally, the substantially vertical front and windshield of such pug-nosed vehicles present a more direct surface to bugs as the vehicle moves horizontally than the more sloped or oblique windshields of non-pug-nosed vehicles.

The inventor has identified a real need in the art for a solution or improvement in this area.

II. BRIEF SUMMARY OF THE INVENTION

It is therefore a principle object, feature, advantage, or aspect of the present invention to provide a bug deflector or shield which improves upon or solves the problems and deficiencies in the art.

Further objects, features, advantages, or aspects of the present invention include an apparatus or method which:

a. is economical;
b. is robust and durable;
c. is adaptable for a wide variety of pug-nosed vehicles;
d. has adjustability for different vehicles;
e. is adjustable relative to the vehicle it is mounted to;
f. in one aspect, is adjustable in two directions relative to the vehicle;
g. in another aspect, can be adjustably spaced from the front of the vehicle;
h. in another aspect, can be adjusted in angular attitude relative the front of the vehicle and its angle of attack to the vehicle's direction of forward movement; and
i. is easy to maintain.

These and other objects, features, advantages, or aspects of the present invention will become more apparent with reference to the accompanying specification and claims.

According to one aspect of the invention, a bug shield or deflector includes an elongated panel or shield. A mount to mount the shield to the vehicle is adapted to allow adjustment of the position of the shield both in distance from the front of the vehicle and in angular orientation.

In another aspect of the invention, an apparatus includes a bug deflector with a mounting interface. A bracket has a first portion mountable to a pug-nosed vehicle front and a second portion with a mounting interface extending out from the first portion. The mounting interfaces of the bracket and bug deflector allow (1) adjustable distance between the deflector and the front of the vehicle and (2) adjustable angle between the deflector and the front of the vehicle.

In another aspect of the invention, a method includes providing a bug deflector to the front of a pug-nosed vehicle, adjusting distance of the deflector from the front of the vehicle, and adjusting angle of the deflector relative to on-coming air and bugs.

In another aspect of the invention, the bug deflector is elongated along an axis and has at least two sections that are obtuse to one another on opposite sides of the axis. The angle of orientation of the deflector can be adjusted relative to the direction of travel of the vehicle to adjust the air flow off of the deflector. In one embodiment the angle is approximately 150°-170°.

III. BRIEF DESCRIPTION OF THE DRAWINGS

Figure 1:
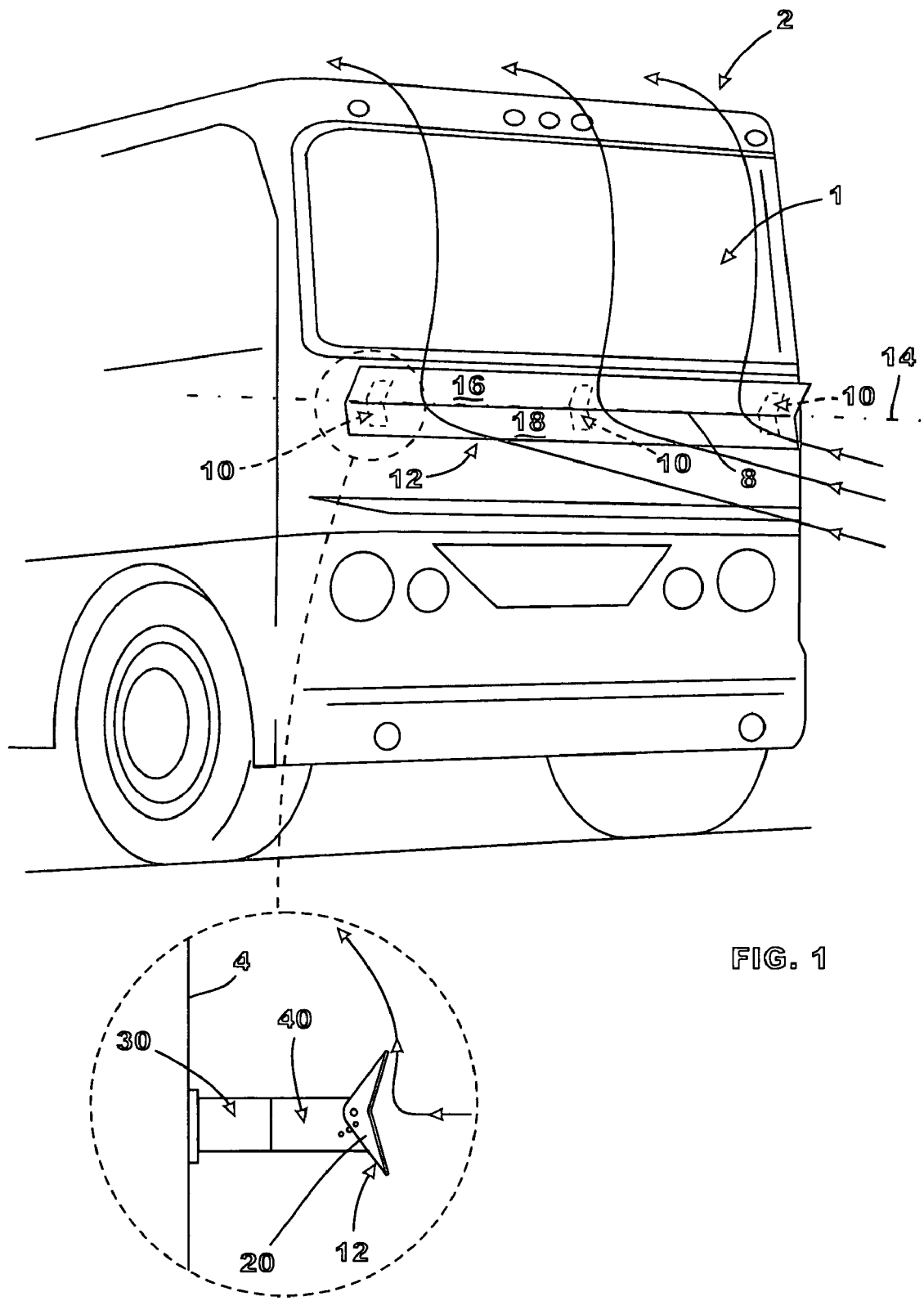
FIG. 1 is a perspective view of the front portion of a pug-nosed vehicle (here a Class A motor home) with a bug deflector assembly according to an exemplary embodiment of the present invention mounted thereon.
Figure 2:
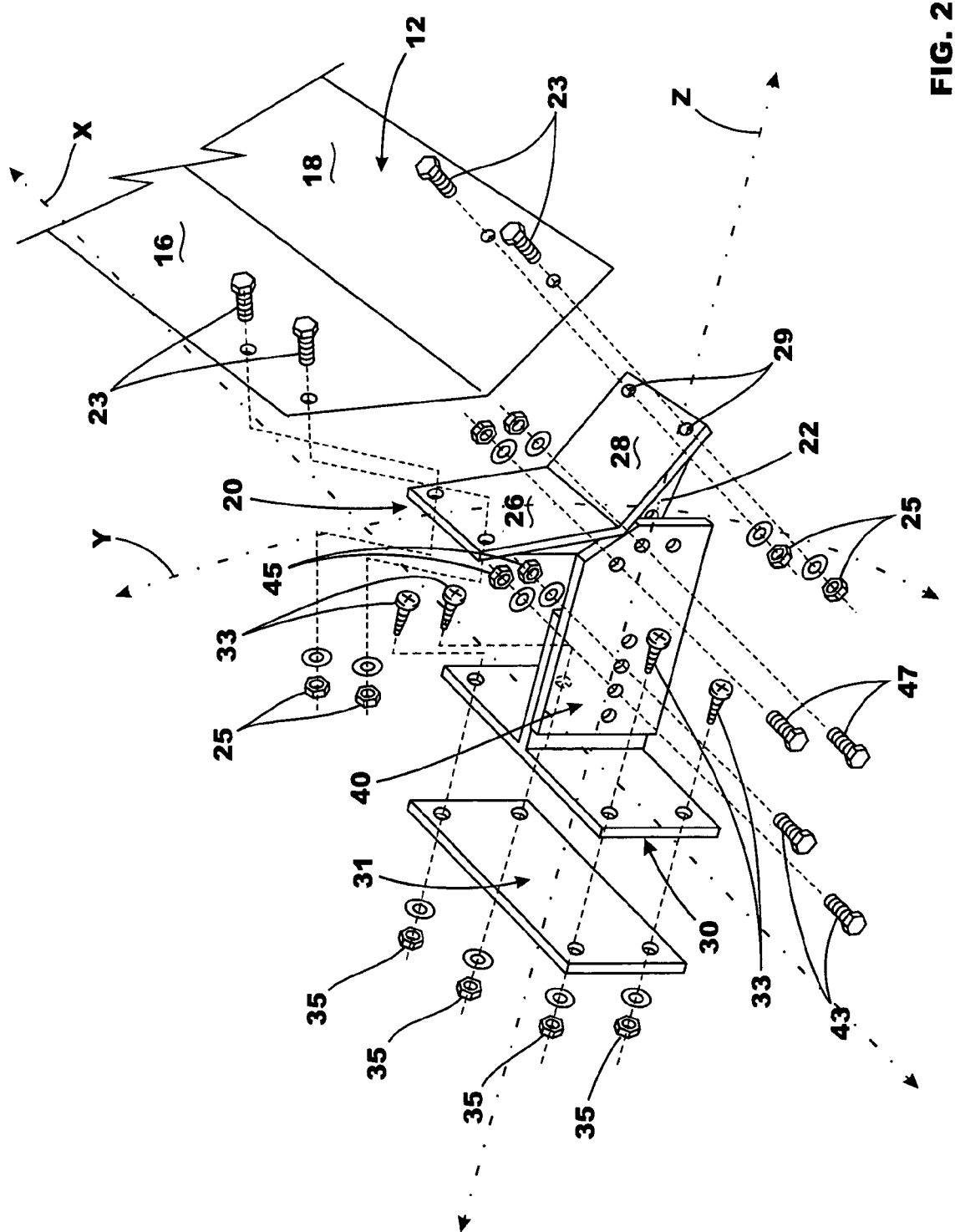
FIG. 2 is an enlarged perspective, partially exploded view of one end of the bug deflector assembly of FIG. 1.
Figure 3:
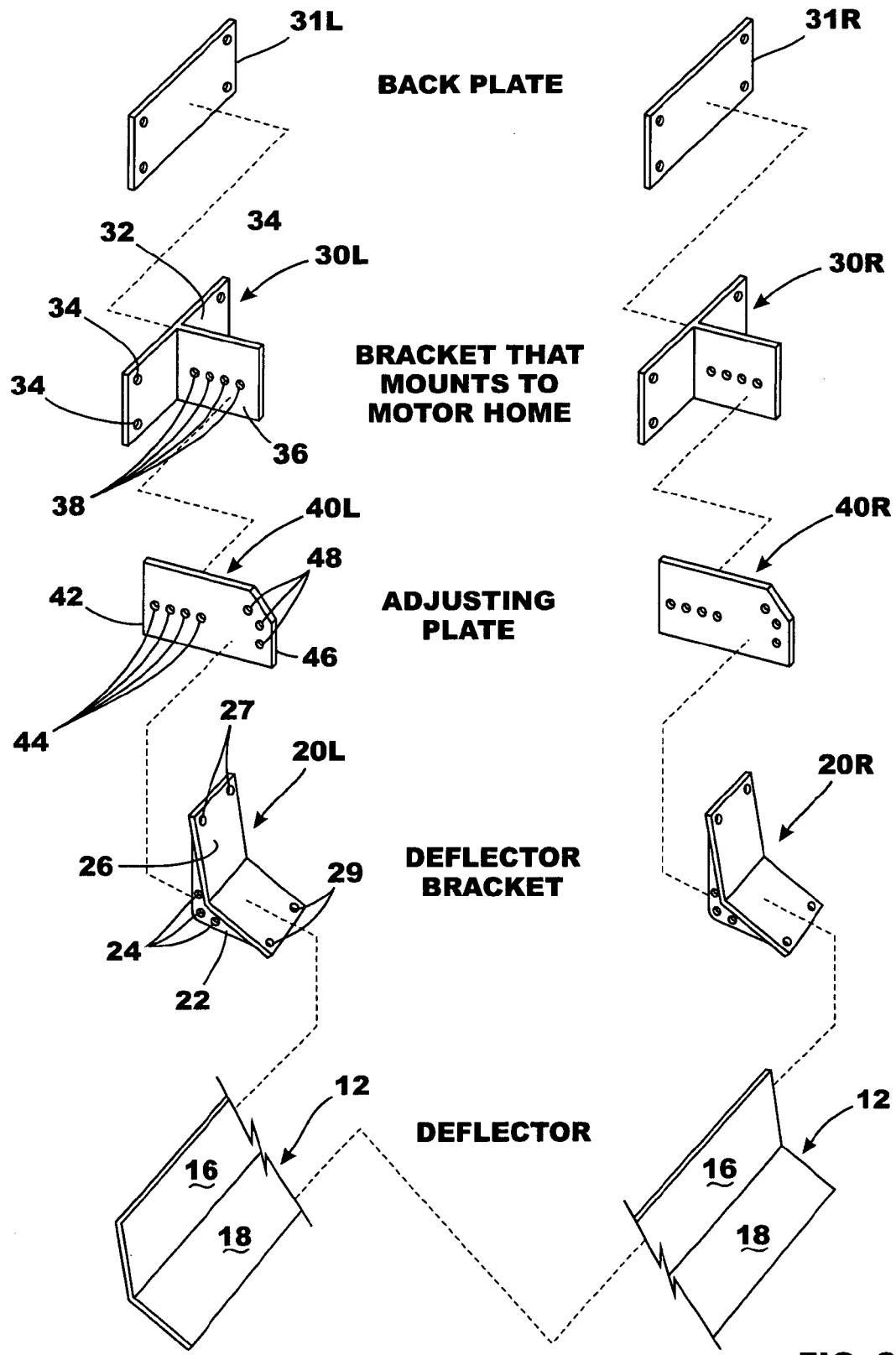
FIG. 3 is an exploded view of the main parts of FIG. 2.
Figure 4A:
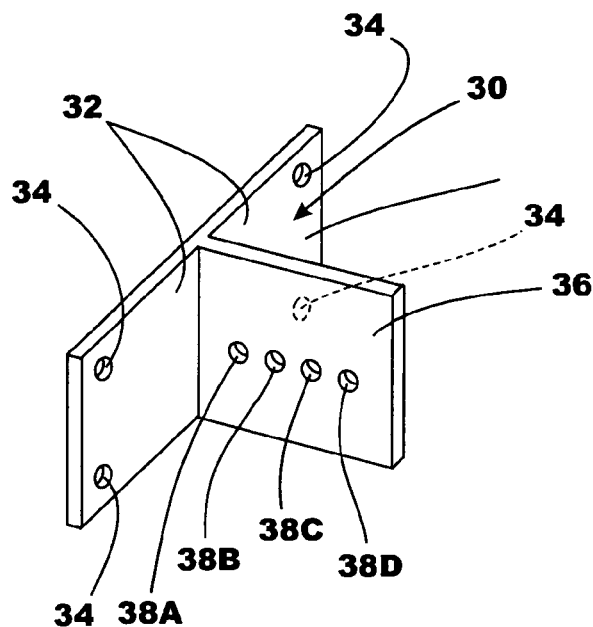
Figure 4B:
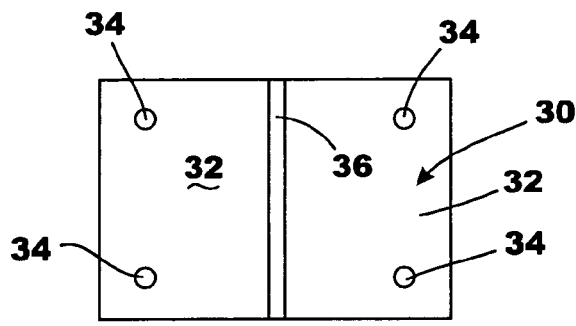

FIGS. 4A and B are isolated, enlarged perspective and front elevation views, respectively, of a first part, namely a mounting bracket from the assembly of FIGS. 1-3, adapted to mount the bug deflector assembly to the front of the vehicle.

Figure 5:
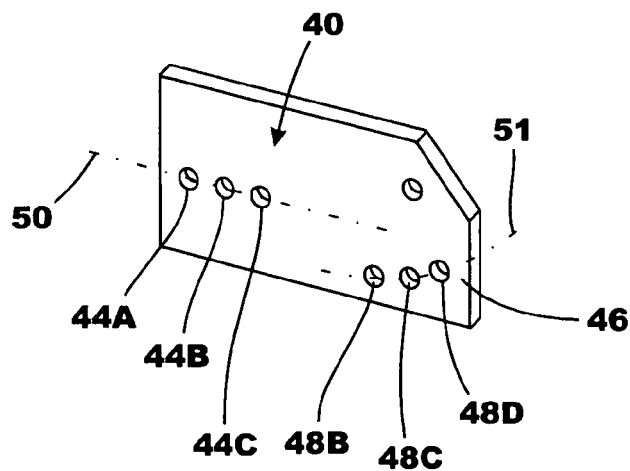

FIG. 5 is an isolated, enlarged perspective view of a second part, an intermediate bracket from the assembly of FIGS. 1-3, that is adjustably attachable at one end to the mounting bracket of FIGS. 4A and B.

Figure 6A:
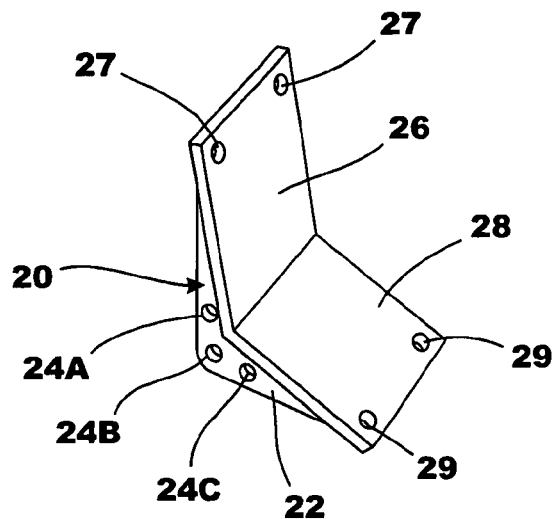
Figure 6B:
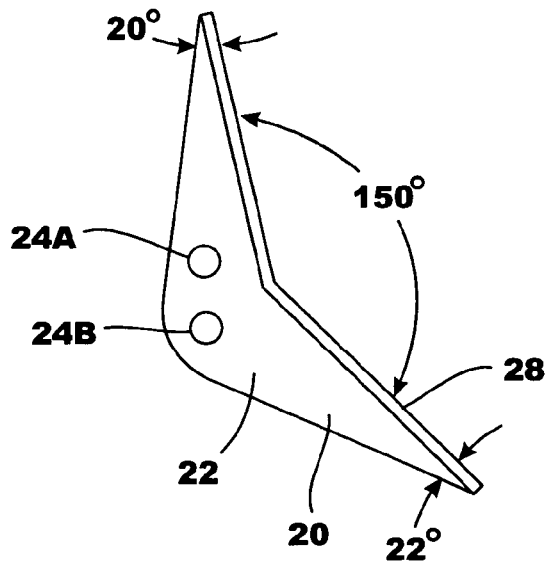
Figure 6C:
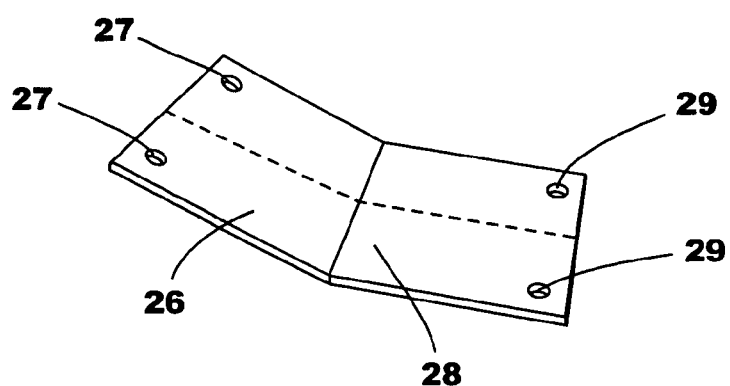

FIGS. 6A-C are isolated, enlarged perspective, side elevation, and partial views, respectively, of a third part, a shield bracket from the assembly of FIGS. 1-3, for supporting the bug deflector shield and for adjustable attachment to one end of the intermediate bracket of FIG. 5.

Figure 7:
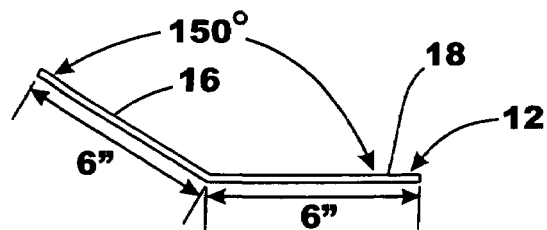

FIG. 7 is an isolated, side plan view of the bug deflector shield of FIGS. 1-3.

Figure 8:
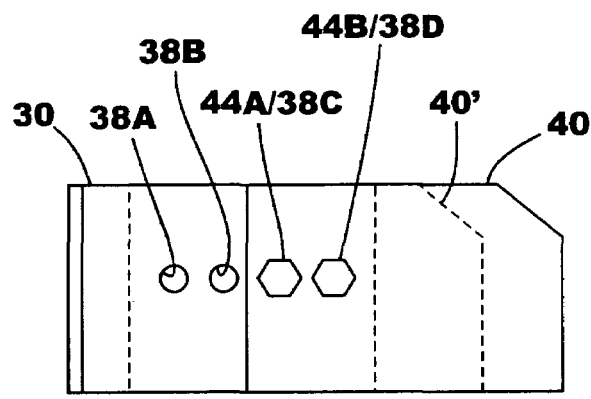
Figure 9:
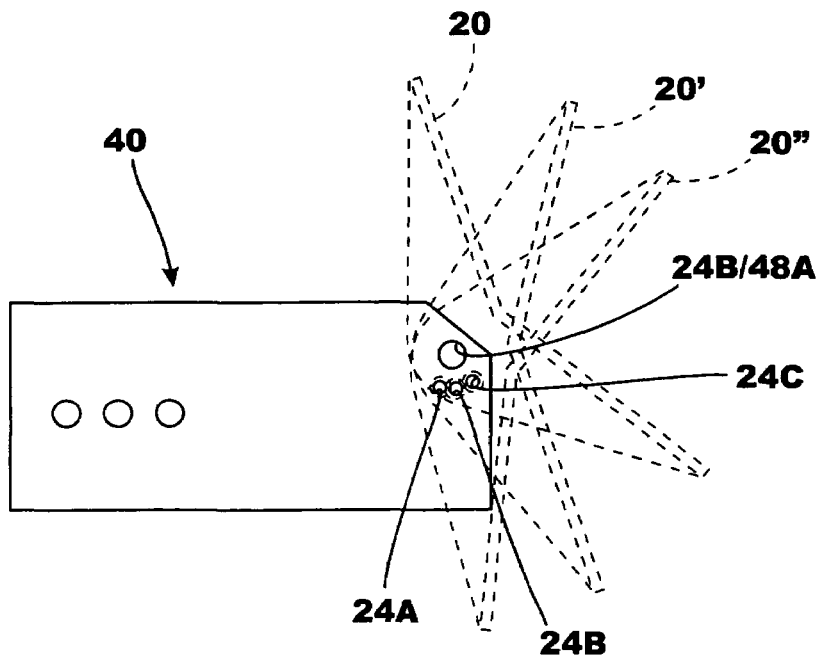

FIG. 8 is a side elevation view illustrating alternative extended positions of the bug deflector assembly relative to spacing from the front of the vehicle FIG. 9 is a side elevation view illustrating alternative angular positions to which the bug deflector shield can be adjusted.

Figure 10:
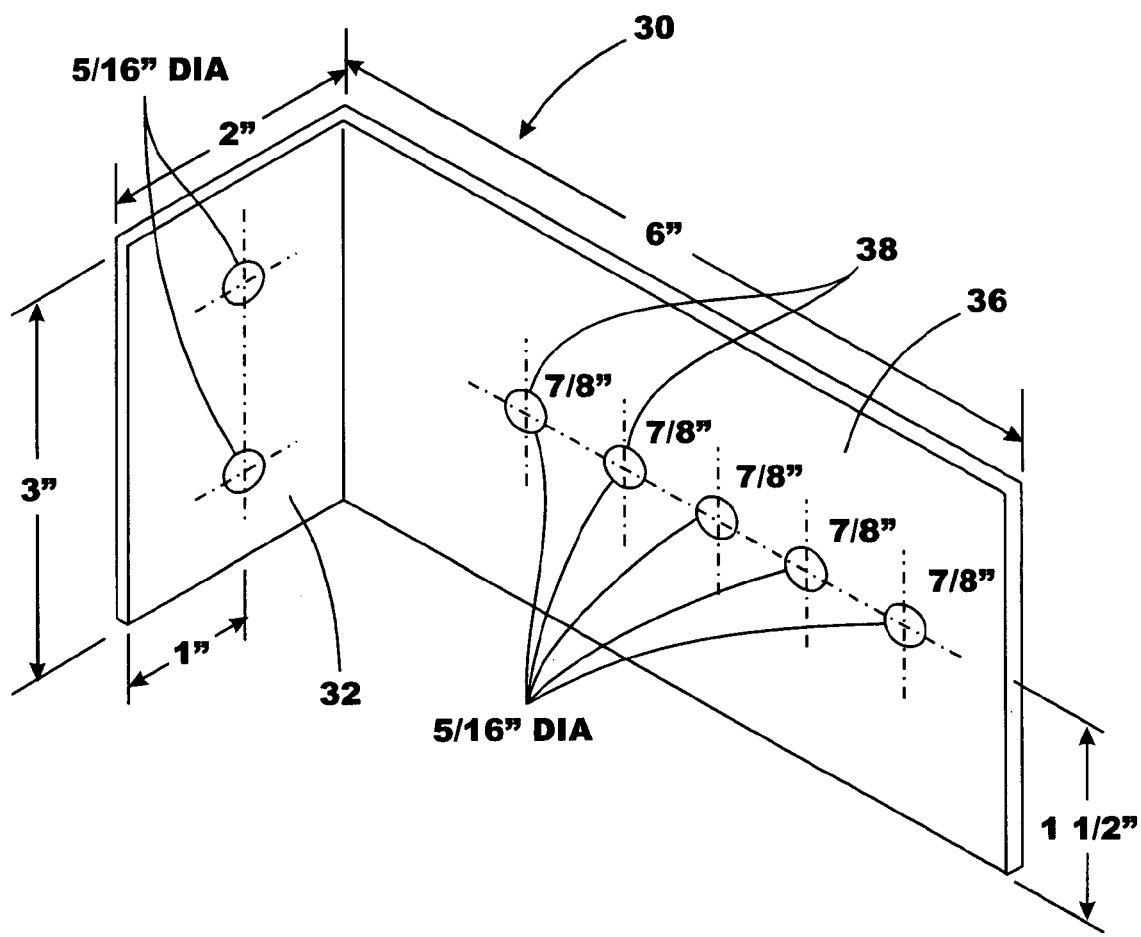

FIG. 10 is a perspective view of an alternative mounting bracket to that of FIGS. 4A and B.

Figure 11:
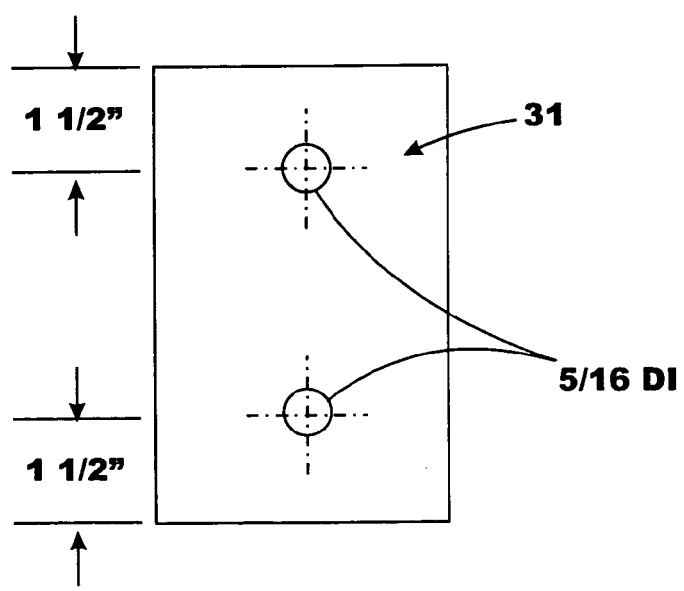

FIG. 11 is a front plan view of a back plate that can be used with the mounting bracket of FIG. 10.

Figure 12:
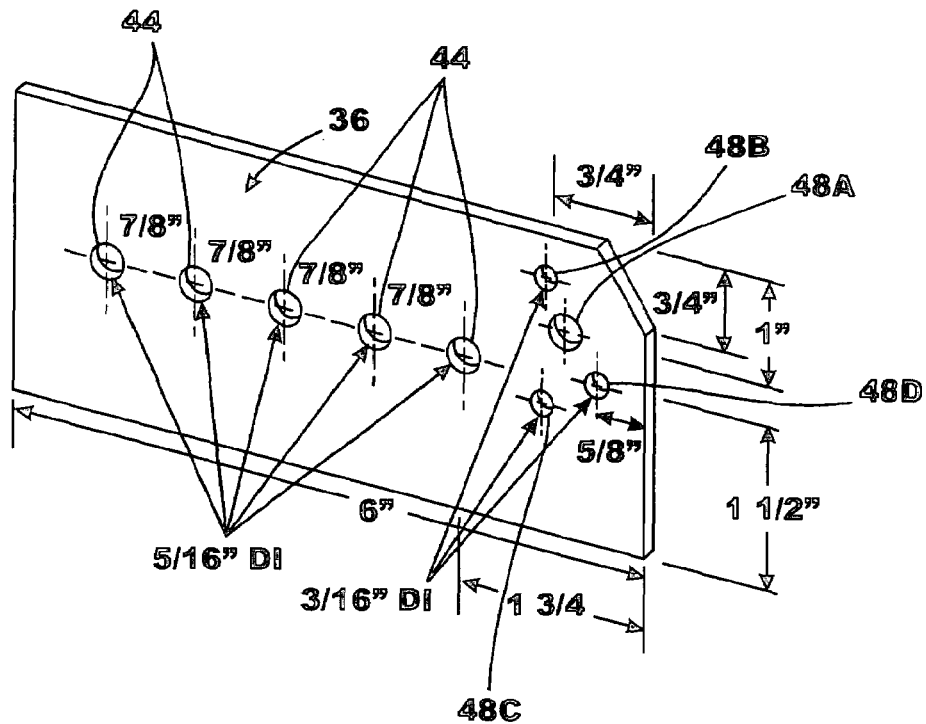

FIG. 12 is an alternative intermediate member to that of FIG. 5 and which can be used with the mounting bracket of FIG. 10.

Figure 13A:
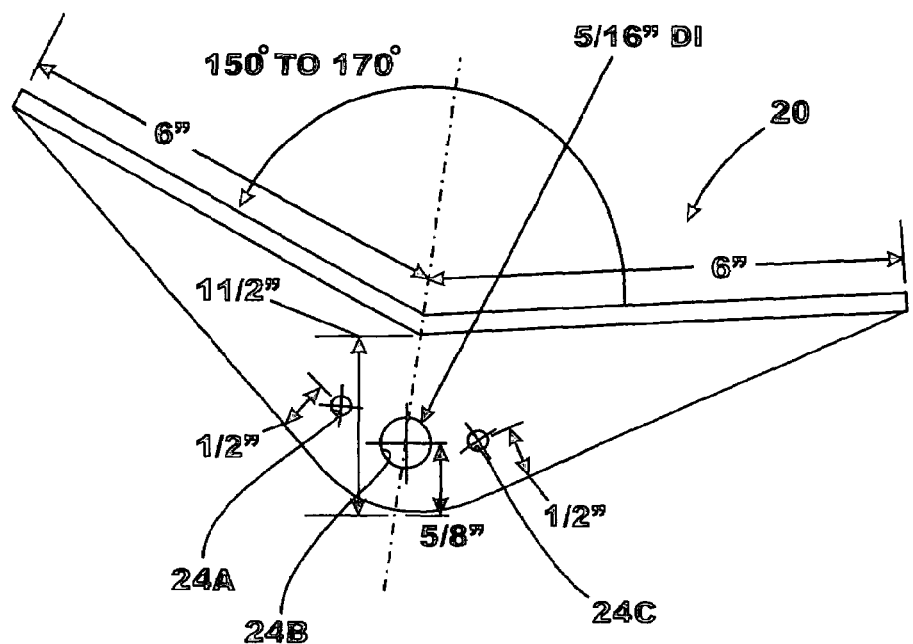
Figure 13B:
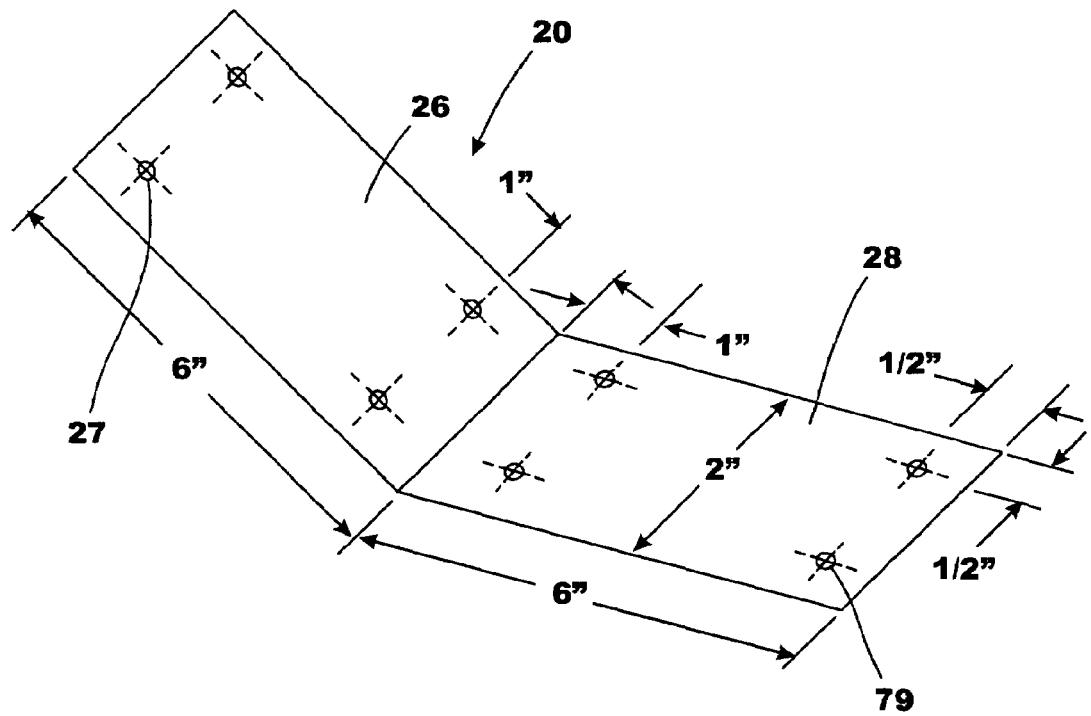

FIG. 13A is a perspective view of an alternative shield bracket to that of FIGS. 6A-C and which can be used with the intermediate member of FIG. 12. FIG. 13B is an isolated perspective view of the top plate of the bracket of FIG. 13A to which a bug shield is mounted.

Figure 14A:
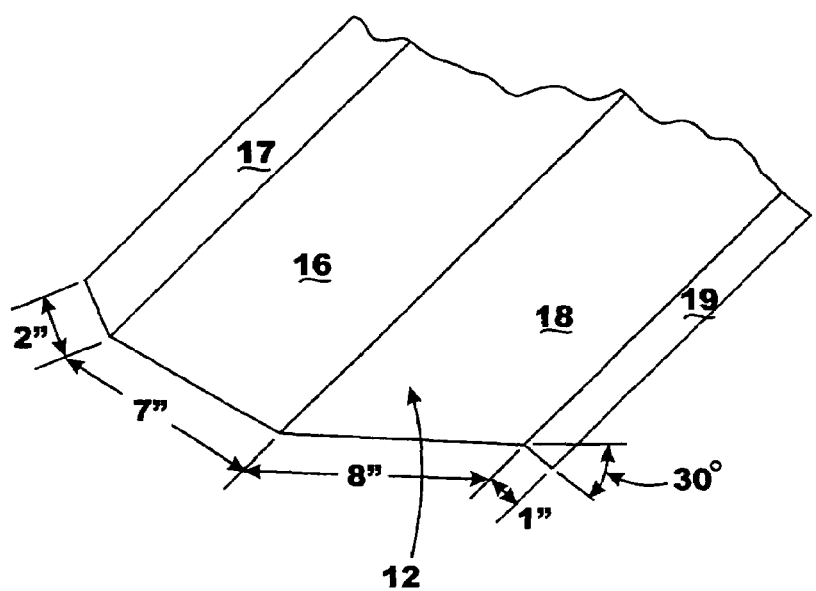
Figure 14B:
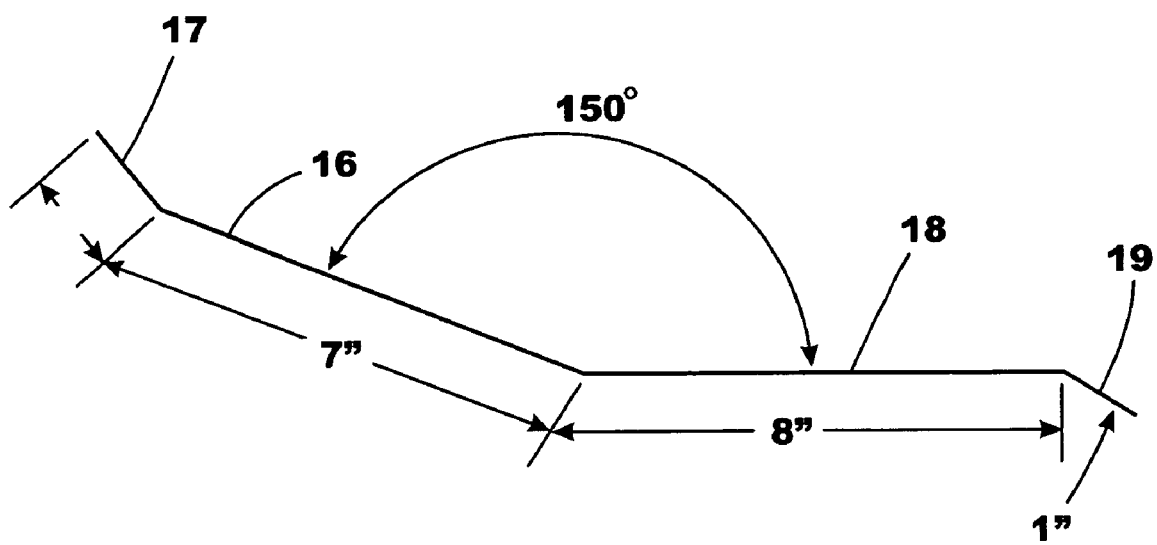

FIGS. 14A and B are perspective and side plan views respectively of an alternative bug deflector shield to that of FIGS. 3 and 7.

IV. DETAILED DESCRIPTION OF THE EXEMPLARY EMBODIMENTS

A. Overview

For a better understanding of the invention, a detailed description of one form the invention can take will now be set forth. Frequent reference will be taken to the drawings. Reference numerals will be used to indicate certain parts and locations in the drawings. The same reference numerals will be used to indicate the same parts or locations throughout the drawings unless otherwise indicated.

The context of this example will be with respect to a Class A motor home 2 (see FIG. 1), having what is referred to herein as a pug-nose. The front, non-windshield, part 4 of the vehicle is basically in a vertical plane. The windshield 6 can be slightly angled back but is substantially at or near the vertical plane of front portion 4. Windshield wipers 8 are used to clear windshield 6 of rain and other debris when possible and many times are mounted to front 4 and extend somewhat forward of windshield 6 and front 4.

While the exemplary embodiments are illustrated and discussed in the context of the Class A motor home of FIG. 1, they are applicable to analogous vehicles.

B. First Exemplary Embodiment

An exemplary embodiment of the invention is illustrated at FIGS. 1-7. The complete bug deflector assembly includes a bug deflector panel 12 and a plurality of bracket assemblies (each bracket assembly contains several separate components and is referred to generally by reference number 10). The bug deflector panel 12 is elongated along axis 14. The bug deflector assembly is adapted to be attached to front 4 of vehicle 2 so that panel 12 extends laterally and forwardly across at least a portion of front 4 of vehicle 2. The primary function of panel 12 is to deflect bugs and air up and over the front of vehicle 2 (see arrows in FIG. 1).

In this embodiment, deflector panel 12 has two sections. The first section 16 is at an obtuse angle to section 18. Deflector panel 12 can be made of a variety of materials. Examples are PLEXIGLAS thermoplastic, LEXAN thermoplastic, polycarbonate, and other plastics. It can also be made of other materials such as glass or metals (e.g. stainless steel, aluminum, etc.). Other materials are possible. It can be partially or fully transparent, semi-transparent, translucent, or opaque. It can be partially or frilly uncolored or of any of a variety of colors.

In this embodiment, as indicated in FIG. 1, its length along axis 14 is substantially the lateral width of pug-nosed vehicle 2, and therefore several feet in length. As indicated in FIG. 7, section 16 is approximately six inches wide, as is section 18 from its junction with section 16 to the bottom edge of bug deflector panel 12, such that the total distance from the top edge to bottom edge along panel 12 is approximately twelve inches or a foot. FIG. 7 also shows that the angle formed between sections 16 and 18 is 150°.

Panel 12 is mounted so that the 150° obtuse angle is facing the direction of forward travel of vehicle 2. It is mounted so that air would horizontally enter the obtuse combination of sections 16 and 18 and be directed somewhat straight up or even forwardly to clear the top edge of section 16. This would direct air in an stream that starts out several inches forward of front 4 of vehicle 2 and then towards the top of vehicle 2, to influence air and bugs to flow up and over windshield 6 (see arrows and isolated diagram in FIG. 1).

As indicated in FIG. 1, in this example mounting of deflector panel 12 to vehicle 2 is by three identical bracket assemblies 10, one near each lateral end of deflector panel 12, and one at or near the middle (the number of brackets can vary). As will be further understood by the description below, these brackets are robust enough to hold deflector panel 12 in place, even against the substantial forces experienced by such a vehicle traveling at highway speeds, including into substantial headwinds. Bracket assemblies 10 also space deflector panel 12 sufficiently forward of vehicle 2 to clear windshield wipers 8 and orient panel 12 at a angle to the direction of travel to create an air flow stream substantially up and over vehicle windshield 6. Placing deflector panel 12 substantially just underneath the bottom edge of windshield 6, and orienting deflector panel 12 appropriately will encourage deflection of air and bugs substantially up and over windshield 6. It also will not materially obstruct the vision of the driver and will not materially effect operation of the vehicle or wipers 8.

FIGS. 2-8 give additional details regarding the mounting assemblies 10 for deflector panel 12. As is indicated at FIG. 1, in this embodiment three sets of mounting assemblies 10 are used to mount deflector to vehicle front 4. Each is identical. Therefore, for sake of brevity, specifics regarding only one mounting assembly 10 will be described here.

Each mounting assembly 10 includes three main parts; (1) a mounting bracket 30 that can be attached to front 4 of vehicle 2, (2) a shield or deflector bracket 20 to which the bug deflector panel 12 is attached, and (3) an intermediate member or adjusting plate 40 which attaches between mounting bracket 30 and shield bracket 20 and facilitates variable spacing of panel 12 relative the front 4 of vehicle 2, as well as variable angular orientation of panel 12 relative the direction of travel of vehicle 2. Specifics about each of parts 20, 30, and 40 will now be discussed.

Vehicle mounting bracket 30 is T-shaped in cross-section. It includes a base plate 32 with four mounting holes 34 and an outwardly extending plate 36 with a plurality of linearly aligned holes 38 (see FIG. 4A). As indicated in FIGS. 2 and 3, a fourth part, back plate 31, can be used to mount mounting bracket 30 to vehicle 2. Back plate 31 is positioned on the inner side of vehicle front 4 and bolts 33 are passed through (a) holes 34 in plate 32, (b) drilled or punched holes through the sheet metal on the front 4 of vehicle 2, and (c) corresponding holes in back plate 31. Nuts 35 (and lock washers) are then used to pull back plate 31 and plate 32 together to clamp bracket 30 to the front of vehicle front 4. Back plate provides structural support for attaching mounting bracket 30 to the sheet metal front 4 of vehicle 2. Alternatively, metal screws or other fastening structure can be inserted through holes 34 to fix each bracket 30 in place on front 4 of vehicle 2, with or without back plate 33. Rubber gaskets or other cushioning and gasketing could be used behind plates 32 and/or 31 if desired.

Shield bracket 20 has a forward plate of two sections 26 and 28 (see FIGS. 6A-C) and a rearwardly extending plate 22. Deflector panel 12 is mountable to the complementary-shaped receiver formed by sections 26 and 28, which are oriented 150° to each other. Mounting holes 27 and 29 allow bolts 23 (and nuts 25) or screws to affix deflector panel 12 to it. Rearward extending flange or plate 22 has a plurality of holes 24 (see FIG. 6A).

Intermediate adjusting plate 40 has a back end 42 and a front end 46 (see FIG. 5). A set of linearly aligned openings 44 exist towards back end 42 (see spacing adjustment axis 50 in FIG. 5). Openings 44 are essentially the same size and same spacing as holes 38 in mounting bracket 30. A set of openings 48 and 49 exist near front 46. Opening 48 is near the top of member 40 and openings 49A-C are aligned substantially along an arc (see angular adjustment axis 51 in FIG. 5) lower on member 40.

As indicated at FIG. 2, utilizing appropriate bolts, nuts, and lock washers, or other mounting hardware, the installer can select between various mounting positions and orientations for deflector panel 12 once mounting bracket 30 is attached to vehicle front 4.

First, holes 44 at rear end 42 of adjusting plate 40 are selectively matched with at least two holes 38 on arm 36 of bracket 30. Two bolts 43 are then inserted therethrough, and nuts 45 (and washers) secure them in place. This basically telescopically adjusts how far out front end 46 of adjusting plate 40 is from plate 32 of bracket 30 (or, in other words, how far deflector panel 12 will be positioned from front 4 of vehicle 2). As illustrated in FIG. 2, bracket 30 and adjusting plate 40 allow several different adjustable positions relative to one another along the z-axis.

Secondly, at least two openings 24 on flange 22 of bracket 20 are aligned with at least two openings 48 on front end 46 of adjusting plate 40. Bolts 47 and nuts 49 (and washers) are used to fix it in that position. This basically pivotally sets the angular orientation of deflector panel 12 relative to the front 4 of vehicle 2 (or, in other words, adjusts the angle of attack or attitude of deflector panel 12 relative to a forward direction). As illustrated in FIG. 5, having openings 48B, C, and D, along an arc would allow, for example, opening 24A of shield bracket 20 to be aligned with and pinned to opening 48A, and opening 24B to be selectively aligned with one of openings 48B, C, or D, and pinned in position, depending on what angle is desired or needed for panel 12. As illustrated in FIG. 2, shield bracket 20 can be mounted in several different positions relative to adjusting plate 40 along the y-axis.

Essentially, the distance deflector panel 12 is from the front 4 of vehicle 2 is adjustable by selecting the appropriate mounting holes between holes 44 and holes 38. Then the angular orientation of deflector panel 12 relative to the front of vehicle 2 is selected by selecting which holes 24 are aligned with which holes 48. This allows for adjustment of the amount of deflection of air and bugs. It also can accommodate clearance for different parts such as windshield wipers 8 or other parts at the front of the vehicle 2.

As can be appreciated, the precise manner in which adjustability of forward spacing and angular orientation of bug panel 12 relative to vehicle 2 can take many forms and configurations. The particular way shown in FIGS. 1-7 is diagrammatic and for illustration purposes only. Variations obvious to those skilled in the art are included.

As can be seen at FIG. 3, each set 10 of mounting pieces is relatively simple in shape and configuration, relatively easy to manufacture, and easy to install and be installed. But they provide the two types of adjustability previously mentioned. Pieces 20, 30, and 40 can be made out of metal plate or other materials that are robust enough for these functions. Grommets or sealing gaskets could be utilized between the different parts optionally.

FIG. 7 illustrates the angle of the two portions 16 and 18 of deflector panel 12. This angle could vary. However, it has been found to effectively deflect bugs and air that essentially is being experienced straight-on by the flat, pug-nosed front of the vehicle without extending too far forwardly of the vehicle. The precise orientation of panel 12 relative to direction of travel of vehicle 2 can be selected. One example is illustrated in FIG. 1 where the top horizontal portion 16 extends forwardly but upwardly and will try to direct or throw air and bugs up and over the windshield. Others are possible. The precise orientation can be selected by the user and depends on a number of things, e.g. the vehicle, the distance panel 12 is spaced from the vehicle, and the position of the panel relative the windshield, the configuration of the panel, and the preferences of the user.

FIGS. 8 and 9 diagrammatically illustrate the two adjustment features. As seen in FIG. 8 by comparing the position of panel 12 in solid lines with it in ghost lines, the embodiment of FIGS. 1-7 gives several inches of forward spacing adjustment for panel 12. Similarly, comparing solid and ghost lines in FIG. 9 diagrammatically illustrates how there are several degrees of angular adjustment available for panel 12. These ranges could vary depending on how the parts are manufactured and configured.

FIG. 8 shows in solid lines plate 40 in a most extended position relative mounting bracket 30, and in a less extended position (see ref. no. 40') in ghost lines.

FIG. 9 shows shield bracket 20 in ghost lines in a first angular position, a second angular position (ref. no. 20') with section 16 tipped more forward, and a third angular position (ref. no. 20") in a still further tipped forward position (which would tend to throw air more forwardly, or create an air stream that would tend to throw air more vertically). The obtuse angle of section 16 and 18 of panel 12, creating roughly a C-shape or a tipped V-shape in the direction of travel of the vehicle, is believed to capture or collect air and help throw it up more vertically the if just a single flat panel were used (although it is possible to use such a single panel with the mounting assembly(ies) 10 here, and adjust both spacing from and angular orientation to the front of the vehicle).

C. Second Exemplary Embodiment

FIGS. 10-13 show an alternative mounting assembly 10. It has the same general parts 20, 30, and 40, and basically functions the same to allow both forward spacing adjustment and angular orientation adjustment for panel 12. The main differences are discussed below.

FIG. 10 illustrates an alternative mounting bracket 30. Mounting bracket 30 differs from bracket 30 of FIGS. 4A and B in that it is L-shaped instead of T-shaped in cross-section. It basically functions the same. Portion 32 would mount by bolts or screws to the front face 4 of motor home 2 in an appropriate location. Holes 38 would be utilized to decide how far forward of the front face of the motor home the deflector actually will be fixed in operating position. Dimensions are shown to give an idea of one form this bracket 30 could take. Variations, of course, can obviously be made to accomplish the same function and are included within the invention. FIG. 11 illustrates an alternative back plate 31 that could be used with mounting bracket 30 of FIG. 10.

FIG. 12 illustrates an alternative intermediate member 40 to that of FIG. 5. Its main differences are that it includes more holes 44 and a different configuration of holes 49. Holes 44 are intended to be complementary to holes 38, to give multiple mounting positions between parts 30 and 40 for different forward spacing of panel 12.

FIG. 13 illustrates alternative shield bracket 20 to that illustrated in FIGS. 6A-C. As noted in FIG. 13, the angle between sections 26 and 28 could vary (150 to 170 degrees). Additionally, the mounting holes 24 differ from those in FIGS. 6A-C.

Holes 48 in member 40 of FIG. 11 are intended to be complimentary to holes 24 in shield bracket 20 of FIG. 13. Main holes 48A and 24B can be aligned and pinned to provide a pivot axis. Then panel 12 can be rotated about that pivot axis to a selected angular orientation and pinned in place through alignment of one of holes 24A or C with at least one of holes 48B, C, or D.

D. Options and Alternatives

It will be appreciated that the present invention can take different forms and embodiments. Variations obvious to those skilled in the art will be included within the invention.

For example, the specific configuration of the parts can vary while retaining the same functions. Certain dimensions and specifications are supplied relative to the embodiments shown in the Figures. However, these are just two examples of the form bracket assembly 10 can take and variations can obviously be made to accomplish similar functions. The parts of bracket assembly 10 can be different in shape, thickness, length, and width.

Another example of an alternative to the embodiments illustrated in the Figures would be as follows. A mounting structure could be integrated with deflector panel 12 which could include an extension with mounting holes that could serve both to adjust the distance of deflector panel 12 for a mounting bracket and its angular orientation to vehicle front 4. In other words, instead of three main parts 20, 30, and 40, they could be consolidated into two—a mounting bracket and a shield bracket, but the shield bracket could be bolted onto the mounting bracket in alternative positions that allow adjust of both spacing and angular orientation.

Furthermore, there could also be alternative ways of connecting deflector panel 12 to its shield bracket or adjustment brackets.

Another example of an option or alternative is the nature and configuration of bug deflector panel 12. FIGS. 14A and B show an alternative deflector panel 12 to that illustrated in FIGS. 3 and 7. Like panel 12 of FIGS. 3 and 7, it has two angularly oriented top and bottom portions 16 and 18. However, it can include top and bottom edge flanges or lips 17 and 19. Examples of one specific angular orientation of end sections 17 and 19 are shown in the drawings. Again dimensions indicated in FIGS. 14A and B are exemplary only and variations are, of course, possible. Panel 12 of FIGS. 14A and B have been found to have the following characteristics. Lips 17 and 19 appear to provide extra lift for air and bugs. Furthermore, they provide extra support and strength along the longitudinal dimension of panel 12. Also, they appear to provide an anti-vibration function for panel 12. The two examples of panel 12 shown in the drawings are one piece (molded or extruded plastic). However, they could be two or more pieces.

The alternative bracket assembly of FIGS. 10-13, and the alternative deflector panel 12 of FIGS. 14A and B could be used in combination to form an alternative embodiment of a deflector that can be adjusted forwardly or rearwardly relative to the front face of the vehicle as desired by using selected mounting positions as well as the deflector can be angularly adjusted as desired, using mounting positions. Alternatively, the alternative bracket assembly of FIGS. 10-13 could be used with the first panel embodiment of FIGS. 3 and 7, or the alternative panel of FIGS. 14A and B could be used with the first embodiment of bracket assembly 10.

The precise angle of orientation of panel 12 can vary. Another position can have the upper section 16 basically vertical (or generally perpendicular to direction of towel) and the lower section 18 an acute angle from horizontal. Some air might travel underneath and up behind panel 12 and other air be deflected by the front side of panel 12.

What is claimed is:

1. A bug deflector assembly for vehicles with substantially vertical fronts comprising:
    an elongated deflector panel comprising first and second sections at an obtuse angle to one another;
    a mount adapted to affix to the front of the vehicle and hold the deflector panel between lateral ends at a spaced apart position forwardly of the front of the vehicle, the mount being adapted to allow adjustable spacing of the deflector panel.

2. The bug deflector of claim 1 wherein the mount is further adapted to allow adjustable angular orientation of the deflector panel relative a forward direction.

3. The bug deflector of claim 1 further comprising a lip extension along at least one edge of said first or second sections of the deflector panel.

4. The bug deflector of claim 3 wherein the lip extension is at an obtuse angle to the section to which it is adjacent.

5. The bug deflector of claim 1 wherein the deflector panel comprises two pieces.

6. The bug deflector of claim 1 wherein the deflector panel is made of polycarbonate.

7. The bug deflector of claim 1 wherein the vehicle is a pug-nosed vehicle.

8. A air/bug deflector assembly for vehicles with substantially vertical fronts comprising:
    a. a bracket having a first portion mountable to the vehicle front and a second portion extending out from the first portion, and a mounting interface;
    b. a deflector having a mounting interface;
    c. the mounting interfaces of the bracket and deflector allowing
        i. adjustable distance between the deflector and the bracket and
        ii. adjustable angle between the deflector and the bracket.

9. The deflector of claim 8 wherein the bracket comprises a first plate and a second plate generally orthogonal to it having a plurality of mounting positions for the deflector.

10. The deflector of claim 8 wherein the deflector is elongated along a longitudinal axis that has a first section and a second section, the first and second sections being oblique relative to one another.

11. The deflector of claim 10 wherein the oblique angle is approximately 150°-170°.

12. The deflector of claim 8 further comprising a mounting interface between the bracket and the deflector, the mounting interface comprising a receiver for mounting the deflector, and the extending portion having a plurality of mounting positions for said bracket.

13. The deflector of claim 8 wherein the deflector comprises plastic, stainless steel, or aluminum.

14. The deflector of claim 8 wherein the mounting interfaces comprises a separate piece between the bracket and the deflector.

15. The deflector of claim 14 wherein the separate piece comprises an elongated adjustment plate having a plurality of mounting positions at each end, one of the plurality mounting positions adapted for outward positioning of the deflector relative to a vehicle front, the other plurality of mounting positions adapted for angular orientation of the deflector relative to the vehicle front.

16. An air and bug deflector for pug-nosed vehicles comprising:
   a. a first mounting bracket comprising
      i. a first plate adapted for mounting to a vehicle front;
      ii. a second plate extending out from the first plate;
   b. a bug deflector having an elongated longitudinal axis and comprising
      i. a first portion and
      ii. a second portion oblique to the first portion along the longitudinal axis;
   c. a second mounting bracket having
      i. a first portion mountable to the bug deflector and
      ii. a second portion extending outwardly therefrom;
   d. an intermediate bracket having
      i. a front end and
      ii. a second end;
   e. the front end of the intermediate bracket mountable to extend at a plurality of mounting positions relative to the deflector, the mounting positions being at different distances from the first plate of the first mounting bracket;
   f. extending the second portion of the second mounting bracket from the second end of the intermediate bracket at one of a plurality of mounting positions, the mounting positions at different angular orientations to the second end;
   g. so that adjustment of distance between the deflector and the front of the vehicle and angular orientation of the deflector relative to the front of the vehicle can be made.

17. A bug deflector assembly for vehicles with substantially vertical fronts comprising:
   an elongated deflector panel comprising first and second sections at an obtuse angle to one another;
   a mount adapted to affix to the front of the vehicle and hold the deflector panel between lateral ends at a spaced apart position forwardly of the front of the vehicle, the mount being adapted to allow adjustable angular orientation of the deflector panel relative a forward direction.

18. A method of deflecting bugs from the front of a vehicle with a substantially vertical front and windshield comprising:
   a. spacing a bug deflector panel forwardly of the vehicle front;
   b. orienting the bug deflector panel so that at least a part of the panel directs air forwardly and upwardly;
   c. wherein the spacing and orienting are adjustable, and the panel comprises top and bottom portions that are oblique to one another and the top portion is oriented at an acute angle to direction of travel of the vehicle when in use.

* * * * *